US008611662B2

(12) United States Patent
Tsai et al.

(10) Patent No.: US 8,611,662 B2
(45) Date of Patent: Dec. 17, 2013

(54) TEXT DETECTION USING MULTI-LAYER CONNECTED COMPONENTS WITH HISTOGRAMS

(75) Inventors: Shang-hsuan Tsai, Stanford, CA (US); Vasudev Parameswaran, Fremont, CA (US); Radek Grzeszczuk, Menlo Park, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/301,103

(22) Filed: Nov. 21, 2011

(65) Prior Publication Data

US 2013/0129216 A1    May 23, 2013

(51) Int. Cl.
*G06K 9/34* (2006.01)

(52) U.S. Cl.
USPC ............................ 382/176; 382/170; 382/177

(58) Field of Classification Search
USPC ................. 382/195, 170, 177, 202, 260, 269; 345/102, 204, 690; 358/1.9, 462
See application file for complete search history.

(56) References Cited

U.S. PATENT DOCUMENTS

| 6,259,813 | B1 * | 7/2001 | Ouchi | 382/195 |
| 7,570,816 | B2 | 8/2009 | Bargeron et al. | 382/224 |
| 2010/0074526 | A1 | 3/2010 | Campbell | 382/176 |

FOREIGN PATENT DOCUMENTS

EP    0 731 599 A2    9/1996

OTHER PUBLICATIONS

Nguyen, T. D. et al.: "Tensor voting based text localization in natural scene images". IEEE Signal Processing Letters, vol. 17, Jul. 2010, pp. 639-642 section II.A.

Yi, C. et al.: "Text string detection from natural scenes by structure-based partition and grouping". IEEE Transactions on Image Processing, vol. 20, Sep. 2011, pp. 2594-2605.

Minetto, R. et al.: "Snoopertext: A multiresolution system for text detection in complex visual scenes". IEEE Int. Conf. on Image Processing, Sep. 26-29, 2010, Hong Kong, pp. 3861-3864.

Tsai, S. S. et al.: "Design of a text detection system via hypothesis generation and verification". Asian Conference on Computer Vision (ACCV2012), Nov. 5-9, 2012 Daejeon, Korea, 14 pages.

Hanif, Shehzad Muhammad, et al., "Text Detection in Natural Scene Images using Spatial Histograms", pp. 122-129.

Kumar, Manoj, et al., "Text Detection using Multilayer Separation in Real Scene Images", 2010 10$^{th}$ IEEE International Conference on Computer and Information Technology, pp. 1413-1417, 2010.

Zhang, Hongming, et al., "Object detection using spatial histogram features", Image and Vision Computer 24, pp. 327-341, 2006.

* cited by examiner

*Primary Examiner* — Anh Do
(74) *Attorney, Agent, or Firm* — Harrington & Smith (57) ABSTRACT

A digital image is converted to a multiple level image, and multiple scale sets are formed from connected components of the multiple level image such that different ones of the scale sets define different size spatial bins. For each of the multiple scale sets there is generated a count of connected components extracted from the respective scale set for each spatial bin; and adjacent spatial bins which represent connected components are linked. Then the connected components from the different scale sets are merged and text line detection is performed on the merged connected components. In one embodiment each of the scale sets is a histogram, and prior to linking all bins with less than a predetermined count are filtered out; and each histogram is extended such that counts of adjacent horizontal and vertical bins are added (single region bins are filtered out) and the linking is on the extended histograms.

20 Claims, 7 Drawing Sheets
(4 of 7 Drawing Sheet(s) Filed in Color)

Figure 2: histograms

Figure 3A: horizontal filtering

Figure 3B: connected components horizontal text lines vertical text line horizontal text line vertical text line Figure 3C: linking connected components

TEXT DETECTION USING MULTI-LAYER CONNECTED COMPONENTS WITH HISTOGRAMS

TECHNICAL FIELD

The exemplary and non-limiting embodiments of this invention relate generally to digital imaging devices and related software, and more particularly relate to text detection and recognition from a digital image such as may be captured by a smart-phone camera.

BACKGROUND

Text recognition is often applied in the areas of computer vision and pattern recognition, specifically for applications where conversion of visual images to digital text is required. Optical character recognition (OCR) systems use flatbed scanners to convert paper documents to digital documents use this technology to convert images of text to digital text. Mobile vision applications such as translation services on smart-phone devices can also use this technology to translate foreign-language text from a picture that a user takes. In the field of digital map creation this technology can be used to create digital content from images sampled periodically, such as from vehicle-mounted devices. From these images, the text on storefronts and road signs can be identified and used to create point of interest (POI) information. However, the current approaches to text detection have not provided as much improvement as initially hoped.

Currently the most successful application in which text recognition systems have been applied is the document conversion system, which often has an accuracy of over 90%. Beyond the flatbed scanner arrangement text recognition systems have not been very successful. One reason for this disparity is that in natural scene images there are unrestricted lighting and view conditions which diminish text recognition accuracy. One approach to solve this problem has been to employ a natural scene text detection algorithm, which is typically applied to localize the text before any recognition attempts are made. The localized text would then have a better lighting condition and could be better used in the second stage of text recognition or pattern matching. However, this approach has not provided as much improvement as initially hoped.

In very broad terms, text detection can be primarily divided into two separate categories: 1) region based text detection; and 2) connected component-based text detection. In the region based method, a sliding window is applied over the digital image and a test is applied to classify whether the window contains text or not. See for example Y. Zhong, H. Zhang, and A. K. Jain, "Automatic caption localization in compressed video," IEEE Trans. Pattern Anal. Mach. Intell., vol. 22, no. 4, pp. 385-392, 2000 (using features in the discrete cosine transform space to classify the region); and also X. Chen and A. L. Yuille, "A time-efficient cascade for real-time object detection: With applications for the visually impaired" in CVPR—Workshops, 2005, p. 28 (using intensity, gradients and features; and training an Adaboost algorithm to perform the classification).

In the connected component approach, the digital image which is being analyzed for text is first transformed into a binary image. Connected components within the image are considered as character candidates. These character candidates are paired and linked to form text lines. The geometric property of text lines are typically used to filter out false positives; see for example A. Clavelli and D. Karatzas, "Text Segmentation in Colour Posters from the Spanish Civil War Era", Int. Conf. on Document Analysis and Recognition, 2009, pp. 181-185; B. Epshtein, E. Ofek, and Y. Wexler, "Detecting text in natural scenes with stroke width transform" in CVPR, 2010, pp. 2963-2970 (see also US Patent Application Publication 2009/0285482 by these same three individuals and similarly titled); and also H. Chen, S. S. Tsai, G. Schroth, D. Chen, R. Grzeszczuk, B. Girod, "Robust text detection in natural images with edge-enhanced maximally stable extremal regions," in ICIP, 2011.

The work by Epshtein et al. considers a text detection scheme based on Stroke Width Transform (SWT). Specifically, the Ephstein et al technique uses a Canny edge detector [see Canny, J., "A Computational Approach To Edge Detection" IEEE Trans. Pattern Analysis and Machine Intelligence, 8(6):679-698, 1986] to find the edges in the image, and then try to find the two sides of a character stroke by shooting a ray in the gradient direction of each detected edge, forming the character candidates based on the corresponding edges. The technique by H. Chen et al. uses MSERs [see for example J. Matas, O. Chum, M. Urban, and T. Pajdla, "Robust wide baseline stereo from maximally stable extremal regions" in British Machine Vision Conference, 2002, vol. 1, pp. 384-393] as character candidates which are enhanced using Canny edges. This technique by H. Chen et al also uses a distance transform based method to calculate the stroke width. And finally, Lukas Neumann, Jiri Matas, "Text localization in real-world images using efficiently pruned exhaustive search", Int. Conf. on Document Analysis and Retrieval, 2011, uses an extended MSER region to extend beyond a bi-level processing. The inventors herein consider the technique in Lukas Neumann et al to localize the text by an exhaustive search throughout all possible regions as too time consuming.

What is needed in the art is an improvement for recognizing text in natural scenes captured via digital imaging, and particularly suitable for use with dynamic applications noted above such as gathering point of interest information (in a smart-phone for example) and creating digital maps (in a vehicle-mounted camera for example).

SUMMARY

The foregoing and other problems are overcome, and other advantages are realized, by the use of the exemplary embodiments of this invention.

In accordance with a first aspect of the invention there is an apparatus comprising at least one processor and at least one memory including computer program code. In this first aspect the at least one memory and the computer program code are configured, with the at least one processor, to cause the apparatus at least to: convert a digital image to a multiple level image; form multiple scale sets from connected components of the multiple level image, in which different ones of the scale sets define different size spatial bins; and for each of the multiple scale sets generate a count of connected components extracted from the respective scale set for each spatial bin and link adjacent spatial bins which represent connected components; then merge the connected components from the different scale sets and perform text line detection on the merged connected components.

In accordance with a second aspect of the invention there is a method comprising: converting a digital image to a multiple level image; for multiple scale sets from connected components of the multiple level image by at least one processor, in which different ones of the scale sets define different size spatial bins; and for each of the multiple scale sets generating a count of connected components extracted from the respective scale set for each spatial bin and linking adjacent spatial bins which represent connected components; then merging the connected components from the different scale sets; and performing text detection on the merged connected components.

In accordance with a third aspect of the invention there is a computer readable memory tangibly storing a program of instructions that are executable by at least one processor. The program of instructions comprises: code for converting a digital image to a multiple level image; code for forming multiple scale sets from connected components of the multiple level image, in which different ones of the scale sets define different size spatial bins; and for each of the multiple scale sets code for generating a count of connected components extracted from the respective scale set for each spatial bin and code for linking adjacent spatial bins which represent connected components; the program further comprising code for merging the connected components from the different scale sets; and code for performing text detection on the merged connected components.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Many prior art approaches to detect text from the background of a digitally captured natural scene use binarization. In this approach a binarization stage is applied to convert the natural scene image into a bi-level image, for example via global binarization, adaptive binarization, or maximally stable extremal regions MSER (see for example "Robust wide baseline stereo from maximally stable extremal regions" cited in the background section above). Further steps consider connected components of the bi-level image as text character candidates and used as the basic building blocks to the subsequent stage of text line formation.

The inventors consider that character candidate generation is the most fundamental stage, meaning the performance of the above binarization process is quite important. But converting the image into the binary form assumes that the text has good contrast as compared to its background in the scene/image. This assumption is not valid for all natural scene images. Consider for example images taken using a camera; the text in the scene may be out of focus, it may contain motion blur, or the text may exhibit non-uniform lighting.

To better address these issues the teachings herein utilize a multi-level approach for text detection. First is presented a summary and thereafter more detailed description with reference to FIGS. 1 through 5 to better detail the various steps with specific examples. In these teachings, instead of converting the natural scene image to a bi-level image it is instead converted it to a multi-level image which better preserves details. In bi-level images it is connected components in the bi-level image which are used as the basic building blocks. But the multi-level approach detailed herein utilizes connected components of different scale sets. This results in overlapping regions of different sizes though, which these teachings deal with using multi-dimensional histograms. Essentially, the histograms are used to organize the multilayer connected components. As will be shown at FIG. 5, the end result of this systematic approach to the overlapped but different sized regions is an improved text detection algorithm.

Figure 3A:
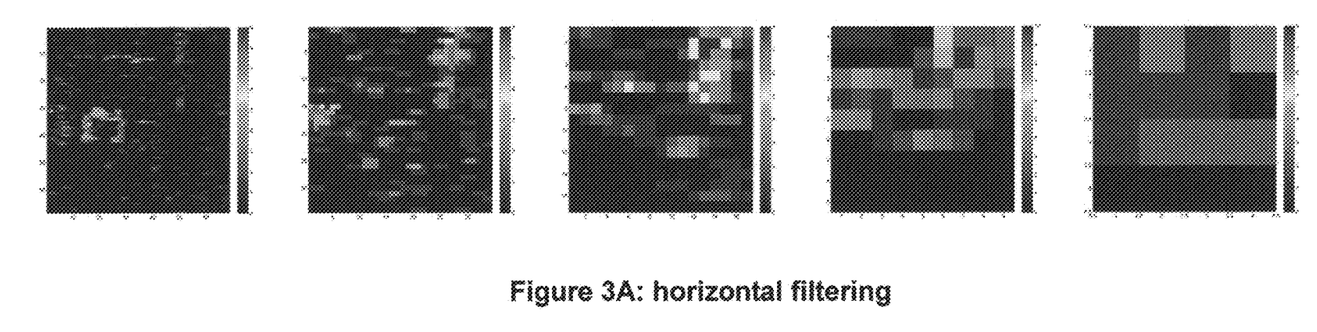
FIG. 3A illustrates horizontal filtering of the histograms of FIG. 2.
Figure 3B:
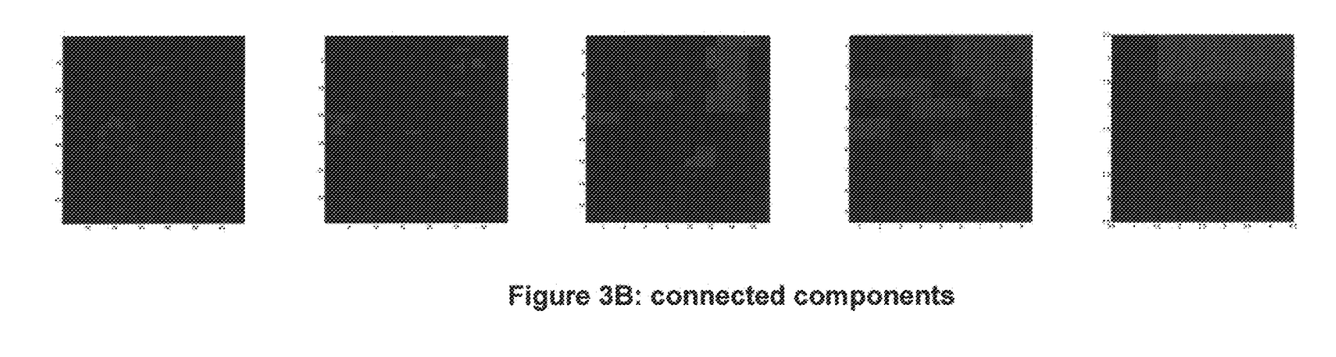
FIG. 3B illustrates marking of the histogram bins from FIG. 3A to retain only those with three or more connected components.
Figure 3C:
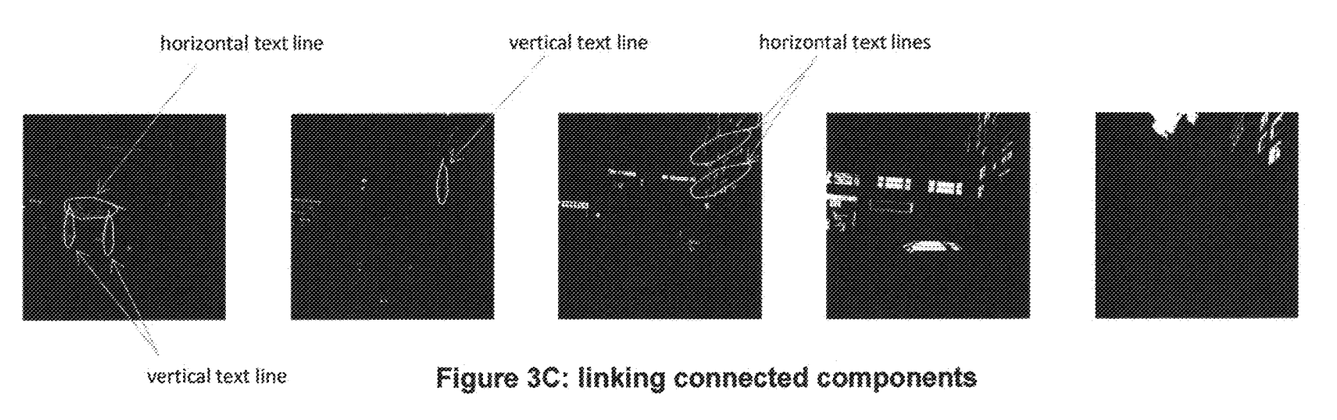
FIG. 3C illustrates horizontal and vertical linking of the connected components retained in the bins of FIG. 3B.

Overlapping connected components are generated from different scale sets of the multi-level image. These different connected components are organized using a multi-dimensional histogram. Each connected component of the multi-level image (generated for example by adaptive binarization or extraction of MSERs) is binned into a histogram bin based on their spatial and geometrical size, and in some embodiments additional geometric properties. Connected components of one size range are counted within the bins of one scale set; those of another size range are counted in the bins of a different scale set, etc. In this manner the multi-level image is used to form the scale sets via the connected components which are the alpha-numerical character candidates. The connected components that fall in a histogram bin which is populated by a given number of connected components are considered as character candidates as shown in FIG. 3B; those bins with less than the given cutoff number are excluded from being further considered as text. As will be seen with FIG. 3A the histogram can also be extended in certain embodiments in the vertical or horizontal direction. Spatially overlapped histograms can be used reduce the boundary effects. Overlapped connected components of the same bin are linked together if it is only a single overlap. Character candidates with in the same histogram bin are then pairwise connected as shown at FIG. 3C, and spatially neighboring bin histogram can also be connected. From the pairwise connected clusters of character candidates, the text lines can then be formed.

As compared to the simple binarization processes used in prior art text recognition techniques, these teachings use histograms to divide multi-layer connected components of an image into different levels for text detection. Also unlike those prior techniques there are overlapped histograms which can be used to mitigate bounding effects. The pairwise connection and linking using the histogram is also seen to be novel over previous approaches.

Figure 1:
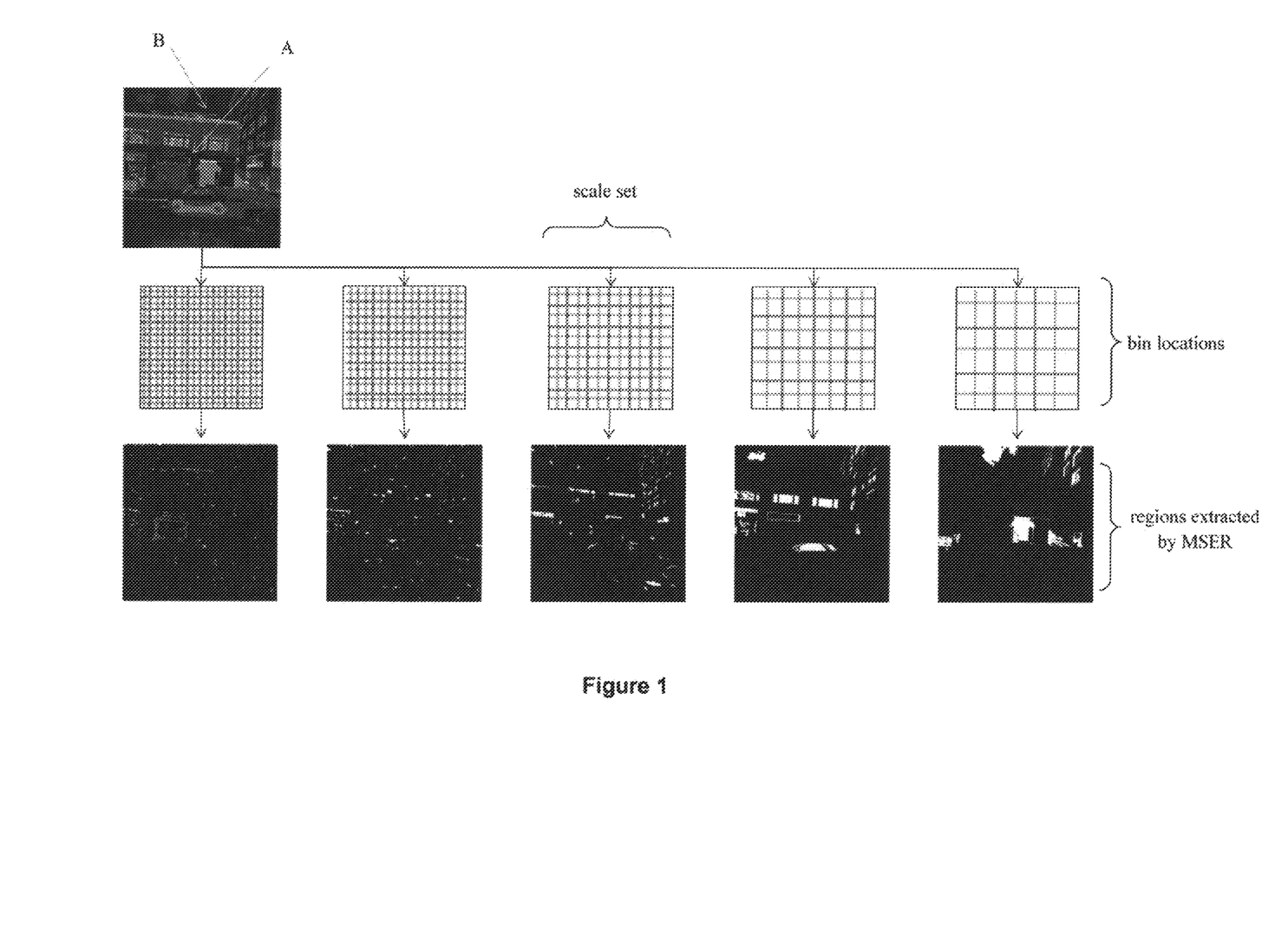
FIG. 1 illustrates a multi-level image that is derived from a captured digital image; the connected components of the multi-level image are passed through different spatial bins and different scales as shown in the second row to form different scale sets and the extracted regions of the last row are used for different scales.
Figure 2:
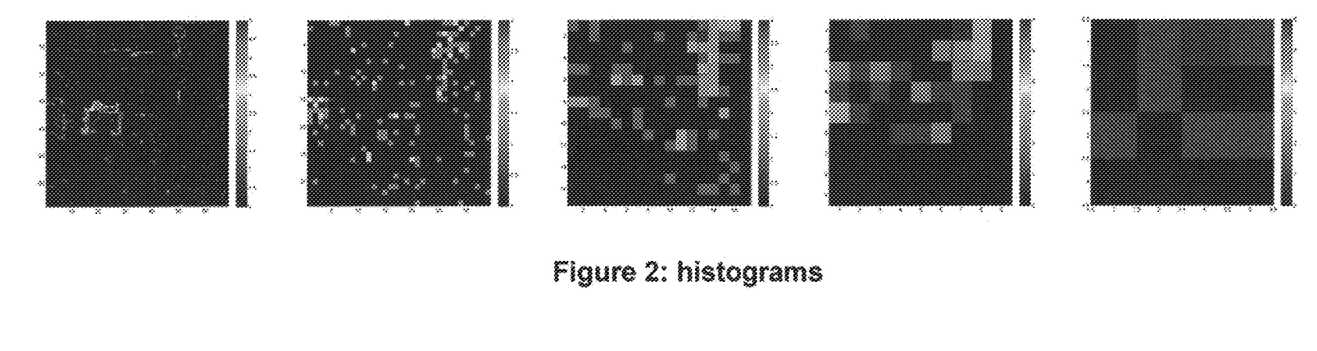
FIG. 2 show histograms of feature counts derived from different size regions extracted from a digital image, such as the extracted regions of FIG. 1.

Now consider a more specific example of this technique with respect to FIGS. 1 through 5. The natural scene image at the top (first row) of FIG. 1 is converted to a multi-level image; FIG. 1 uses MSER but adaptive binarization or other extraction techniques can work with similar effectiveness. The second row of FIG. 1 shows bin locations bounded by the spatial grids. Different color (different shading in the black and white of FIG. 1) of the grid lines in each single block within this second row reveal that each block has two separate grids, meaning each point or pixel on the image for a given block is contained within two different bins which overlap. The technique can readily be extended to three or more overlapping same-size grids per block or reduced to one so there is no overlapping of same-size bins, but however many same-size grids there are this is considered one level set. Notice that each different block in the bin location row is a different size; each different-sized grid block thus represent a different scale set of the MSER (or adaptive binary, etc.) extraction. FIG. 1 illustrates a total of five scale sets. The second row illustrating the bin locations is for the reader's conceptual understanding of how the histograms of FIG. 2 are developed.

The lowermost row of FIG. 1 illustrates the multi-level extraction from the image at the top of FIG. 1, each block representing one level and each block being conceptually divided according to the grid lines in the bin location block immediately above it. Thus the leftmost extracted region is divided into the smallest bin sizes (smallest scale set, for example 10-30 pixels per bin) and the rightmost extraction is divided into the largest bin sizes (largest scale set, for example 42-126 pixels). This is the multi-layer extraction, each different size bin representing a different level of the extraction and a different size bin into which the connected components are located. Naturally the leftmost region at FIG. 1 does not illustrate an extraction for the entire image but this is a limit to the illustration; in practice the entire image is extracted on the multiple levels/scales according to the different bin sizes. This means that not only do the same-size bins in a given block overlap (if there are two or more overlapping grids per scale as is shown at FIG. 1), but different size bins in different blocks also overlap (since some of the same pixels of the original image are represented in the overlapped bins). It is these bins that are used to generate the histograms. Connected components are extracted from the multi-level image based on the scale sets, and as described above each block of the lowermost row of FIG. 1 represents one scale set. The smallest scale set at the left of FIG. 1 will identify character candidates with a relatively small font size and the largest scale set at the right of FIG. 1 will identify the character candidates with relatively large font size. For MSERs, each scale set can correspond to different detected MSER regions.

Each different scale set extraction (in the lowermost row) of FIG. 1 will generate one histogram, and the location of components in a given extraction bin will be counted and the count will be disposed in that same bin of the corresponding histogram. If not corrected via the implementing software, any overlapping same-size bins of a given level will cause a given component to be double or triple counted (depending on how may overlapping grids there are per level). Even without correction the end result is not affected since all pixels will be similarly double or triple counted, so long as all scale levels of the extraction utilize the same number of overlapping same-size grids. If there are a different number of same-size grids in the different extraction sets, some normalization of the histogram counts will be needed for later in the process when the overlapping different-size bins are combined.

MSER has proven quite useful in text detection. In an image, text characters typically have somewhat uniform color; specifically they have relatively little color variance in the character interior and high variance at the letter boundaries. These conditions correlate well with stable results that MSER seeks within an image, and so the MSERs can be treated as text character candidates. When there is blur or noise the boundary is less defined, so allowing more lenient thresholds for MSER detection better assures more regions are identified (and fewer actual characters are not recognized). The increased computational complexity inherent in the greater number of MSERs due to lenient thresholds is offset by fast and efficient processing via the histogram filtering detailed herein.

FIG. 2 illustrates the histograms. In this embodiment the histograms have dimensions 'size', 'x-coordinate' and 'y-coordinate' of the connected component per scale set. Other embodiments may use other geometric components (for example, radial coordinates in place of Cartesian x and y coordinates). Adjacent spatial bins are then offset by only one value of x or y, and it is these adjacent bins of connected components in each histogram/scale set which are linked as detailed below. Embodied software implementing these teachings need not generate pictorial histograms as are shown at FIG. 2, it is sufficient that the bins and corresponding counts per bin are represented in the implementing software by digital bits. For clarity of illustration the FIG. 2 histograms are not exactly drawn from the extracted levels of FIG. 1, but an important point is that there are different spatial grids (meaning different bin sizes) for the different histograms. Three dimensional histograms with a count of connected components per bin are created from the multi-level extractions shown at FIG. 1. One approach to create these histograms is to use the bin center and size of the bounding box/bin for counting in which bin the connected components will be represented. The histograms shown at FIG. 2 are spatially overlapping to mitigate boundary effects. The different colors (different grey-scales as FIG. 2 illustrates) represent a different count or probability for how many connected components are within that bin.

Each different scale level of the histogram is separately filtered. As illustrated at FIG. 3A, the histogram from FIG. 2 immediately above is extended in the horizontal direction so that for each bin, the counts of the horizontally adjacent neighbor bins are added. The same is done in the vertical direction. This assists in finding better character candidates, particularly by filtering out single regions that do not connect with others. This also greatly reduces the computational burden by eliminating MSERs, of which as was noted above a larger number are generated due to more lenient boundary thresholds.

Figure 5:
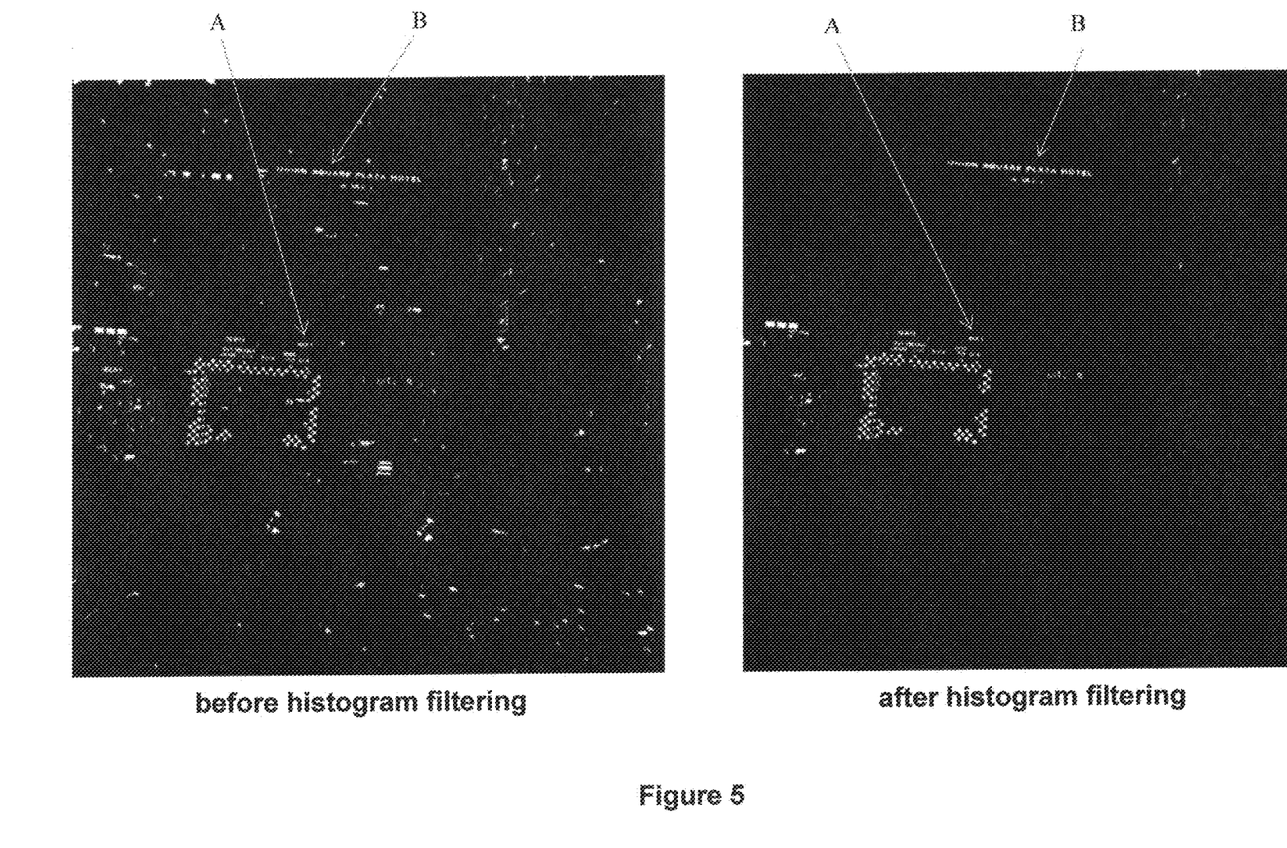
FIG. 5 illustrates the entire digital image of FIG. 1 after being processed according to these teachings before the histogram filtering (left) and after such filtering (right).

If the result of the horizontal filtering shown at FIG. 3A plus the similar vertical filtering is considered to be a directional histogram, then the next step at FIG. 3B is to filter out all those bins of the directional histogram in which the count is less than some predetermined (constant) threshold, for example 3 connected components (the assumption being that all words will have at minimum three characters). Only MSERs that fall within these regions are kept as candidates for being text characters. The implementing software may in an embodiment for this step retain a list of indices to the connected components that fall into each level's histogram. Using this list the connected components that are singly overlapped are then merged. In case of multiple overlapped regions, the larger regions are removed. FIG. 5 illustrates the result of this filtering; the left side is prior to filtering and the right side is after which effectively removes more 'noise' from later processing steps of the text detection algorithm. Regions "A" and "B" from FIG. 1 are shown also at FIG. 5 to better correlate these drawings for the reader.

Finally at FIG. 3C the connected components that are within the same histogram bin and also within neighboring same-size bins are linked. FIG. 3C illustrates this with one color (or level of grey-scale shading) for connections in the horizontal direction and a different color (or level of grey-scale shading) for connections in the vertical direction.

Then the linked components from the different scale sets are merged. It is convenient to start from the smaller scale sets and move toward the larger, adding pairs of connected MSERs from the next larger histogram for each successive set. If a newly added MMSER region is spatially overlapped with another MSER region within the set it is merged with the original one and is also updated to reflect the merge. If the newly added region is spatially overlapped with two or more MSER regions within the set then the region is not merged.

Text line detection can then be performed on the linked connected components. Since text nearly always appears in the form of straight lines or slight curves, text line detection is an important cue for text detection. Rules for comparing stroke width and character height of pairwise groups of letter candidates are used to generate text lines, for example 1.5 maximum ratio for stroke width medians and 2.0 for stroke height medians (taking uppercase and lowercase letters into account).

Figure 4:
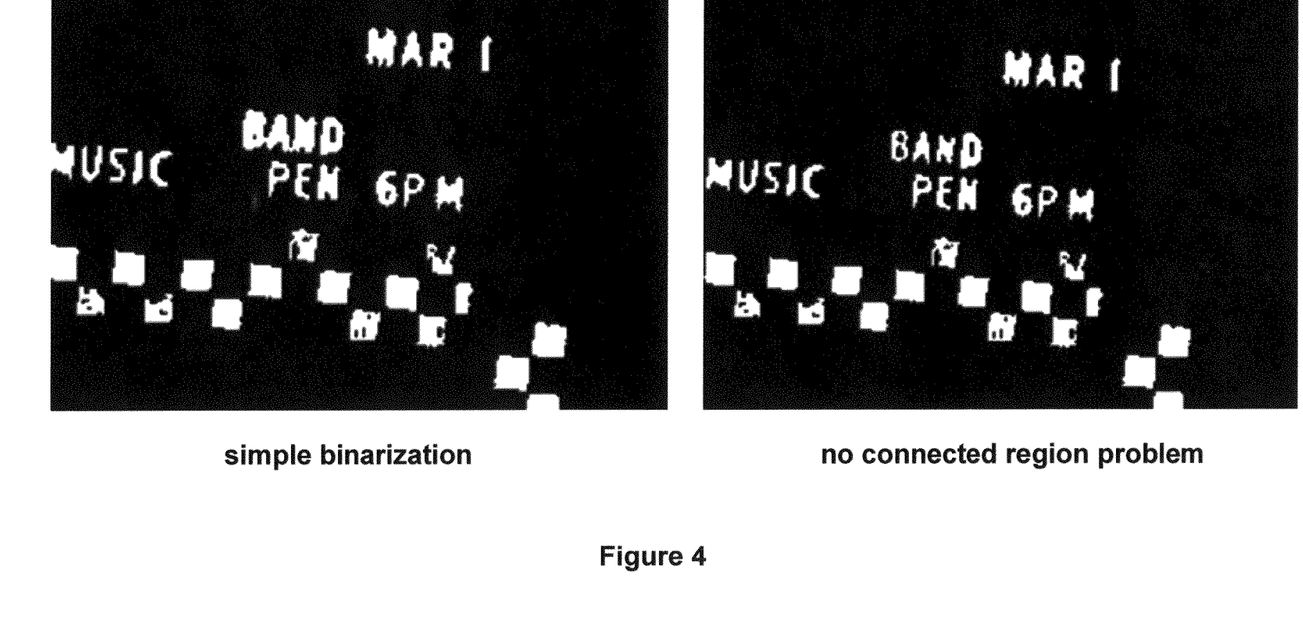
FIG. 4 compares a simple binarization scheme (left) with a multi-layer scheme (right) according to these teachings for recognizing text shown at the area "A" of FIG. 1.

Results for region "B" of FIG. 1 are shown at FIG. 4, the left side representing results from simple binarization and the right side representing results of the multi-level histogram process detailed above. Note that in the text word "BAND", the first three characters "BAN" are poorly resolved under simple binarization but are much better resolved using these teachings which better deals with problems in connecting different regions. Note that while the simple binarization technique at the left of FIG. 4 is still recognizable as text, the distinction between the two results shown at FIG. 4 is significant enough that in other images there might be text which the simple binarization technique does not recognize as text but which are not missed by an algorithm which functions according to these teachings.

Additional refinements can further be added to the above steps to improve performance, such as for example performing a stroke width test to filter out false character candidates, comparing candidate character size before pairwise linking, and enhancing the edges of the candidate characters (for example, Canny edges or other techniques) before pairwise linking.

Exemplary embodiments of these teachings provide the following technical effects as compared to the prior art. These techniques can work with multi-level images and would be able to preserve more information than earlier techniques, and the multi-dimensional approach can preserve similar and nearby connected components, removing other connected components that act as clutter as shown particularly at FIG. 5. Additionally, component connection and linking is a more simplified process when histograms are used to facilitate as is detailed above.

Embodiments of these teachings can be advantageously employed in navigation mapping and point of interest services, such as to generate point of interest information from a user's smart-phone or from a vehicle mounted digital mapping platform to generate point of interest information to be presented on or alongside such digital maps or points of interest. For example, a user may capture the image of FIG. 1 on his/her smart-phone and upload it to a service provider server, who then performs the multi-layer extraction and text recognition as detailed above and presents to its customer the name of the band and the performance time which is shown at FIG. 4 when such customers enter a search for the address or the name of the hotel at which the band is playing or the name of the band itself.

There are numerous host devices in which embodiments of the invention can be implemented, including mobile terminals/smart-phones or servers and other computer equipment which may or may not have an image capturing device (for example, the server in the above example would not have its own digital camera). Without loss of generality consider the host device of FIG. 6 which includes one or more controllers, such as a computer or a data processor (DP) 10A, a computer-readable storage medium embodied as a memory that stores a program of computer instructions 10C as well as the digital image 10E to be processed/analyzed, and an output 10F for providing results of the multi-level extraction image processing in any of various forms to further devices such as other servers.

Figure 6:
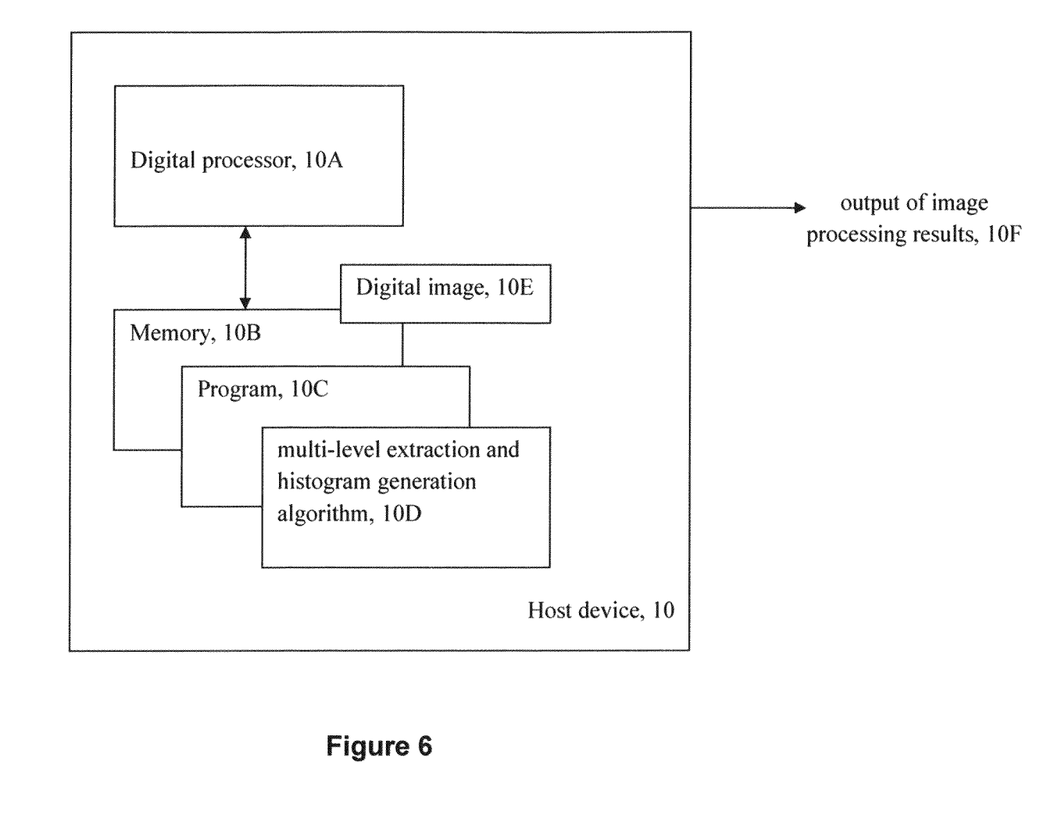
FIG. 6 shows a particularized block diagram of a host device with a program for performing the text detection detailed herein stored in a computer readable memory according to an embodiment of these teachings.

At least one of the programs 10C is assumed to include program instructions that, when executed by the associated DP 10A, enable the apparatus 10 to operate in accordance with the exemplary embodiments of this invention, as detailed above by example. One such program is the multi-level extraction and histogram generation algorithm as shown at block 10D and which is also stored in the MEM 10B. Exemplary embodiments of this invention thus may be implemented at least in part by computer software executable by the DP 10A of the UE 10, or by a combination of software and hardware (and firmware).

Representative host devices need not have the capability, as mobile terminals/smart-phones do, of wirelessly communicating with other electronic devices.

The computer readable memory may be of any type suitable to the local technical environment and may be implemented using any suitable data storage technology, such as semiconductor based memory devices, flash memory, magnetic memory devices and systems, optical memory devices and systems, fixed memory and removable memory. The DP 10A may be of any type suitable to the local technical environment, and may include one or more of general purpose computers, special purpose computers, application specific integrated circuits, read-out integrated circuits, microprocessors, digital signal processors (DSPs) and processors based on a dual/multicore processor architecture, as non-limiting examples.

Figure 7:
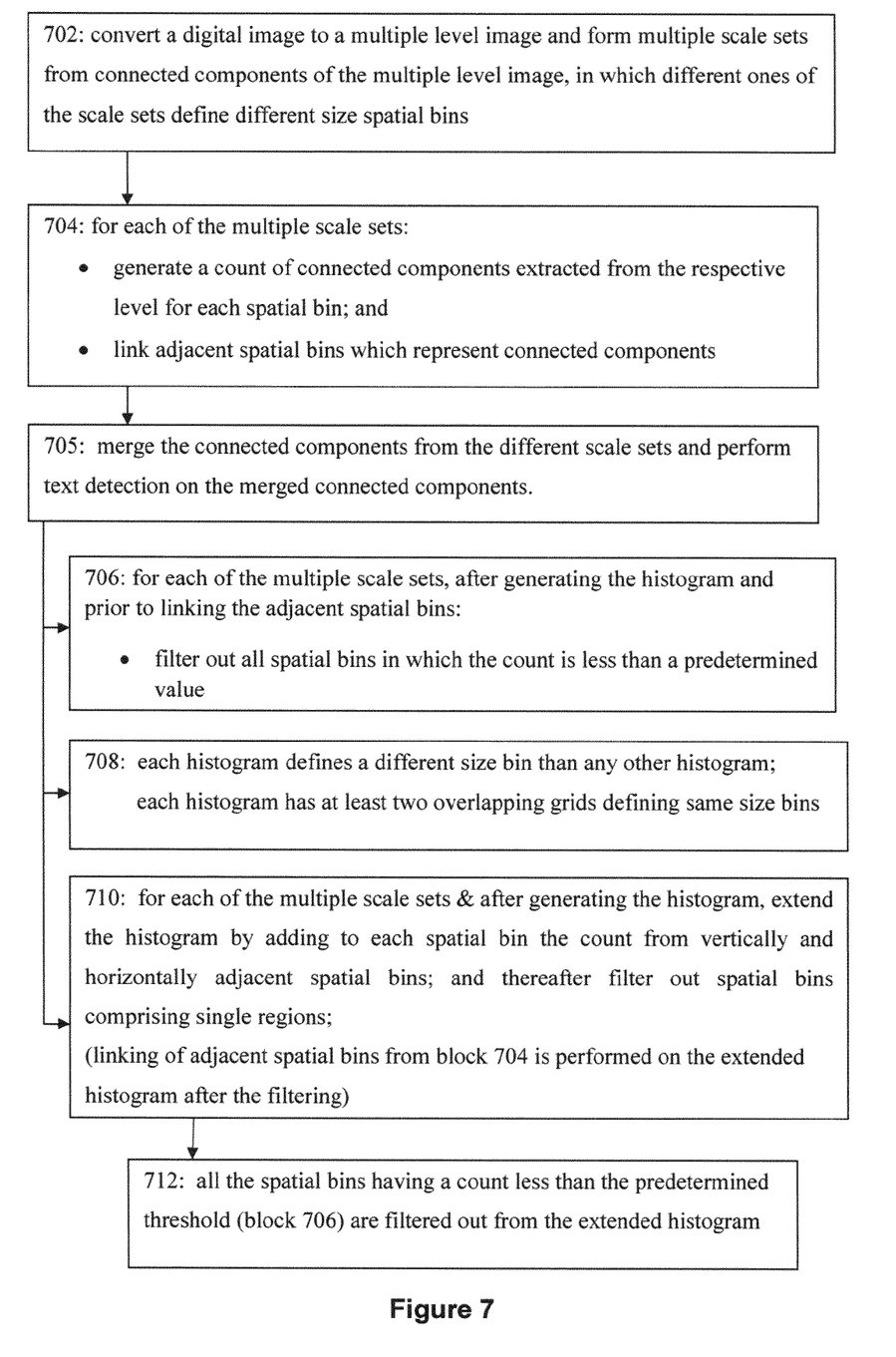
FIG. 7 is a logic flow diagram that illustrates the operation of a method, and a result of execution of computer program instructions embodied on a computer readable memory, in accordance with the exemplary embodiments of these teachings.

FIG. 7 is a logic flow diagram that illustrates the operation of a method, and a result of execution of computer program instructions, in accordance with the exemplary embodiments of this invention. In accordance with these exemplary embodiments, block 702 gives the initial step of converting a digital image to a multiple-level image and forming multiple scale sets from connected components of the multiple level image, in which different ones of the spatial sets define different size spatial bins. Then at block 704 is the per scale set processing, namely for each of the multiple scale sets there is generated a count of connected components extracted from the respective level for each spatial bin, and also for each scale set adjacent spatial bins which represent connected components are linked. Block 705 then further adds that the connected components from the different scale sets are merged and then text line detection is performed on the merged connected components.

Further portions of FIG. 7 summarize various of the more specific embodiments. Block 706 details that for each of the multiple scale sets the count of components for each spatial bin comprises a histogram, and additionally tells that for each of the multiple scale sets, after generating the histogram and prior to linking the adjacent spatial bins, all spatial bins in which the count is less than a predetermined value are filtered out. Block 708 gives two specifics from the above example: each histogram defines a different size bin than any other histogram, and each histogram comprises at least two overlapping grids defining same size bins.

Block 710 details further that for each of the multiple scale sets, after generating the histogram, the histogram is extended by adding to each spatial bin the count from vertically and horizontally adjacent spatial bins, and thereafter spatial bins comprising single regions are filtered out. In this case the linking of the adjacent spatial bins mentioned at block 704 is performed on the extended histogram, after the filtering. Block 712 further details that the filtering of block 706 where all the spatial bins having a count less than the predetermined threshold is done on the extended histogram noted at block 710.

As noted above but not summarized at FIG. 7, the performance can be improved by testing text stroke width when linking adjacent bins or when performing text detection to filter out false text character candidates; and/or by comparing size of characters and only linking adjacent spatial bins if the underlying characters are of similar size. While the above example extracted the components from each multiple level using maximally stable extremal regions MSERs, binarization (including adaptive binarization) can also be used for this purpose.

The various blocks shown in FIG. 7 and the more detailed implementations immediately above may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   at least one processor; and
   at least one memory including computer program code,
   in which the at least one memory and the computer program code are configured, with the at least one processor, to cause the apparatus at least to:
   convert a digital image to a multiple level image;
   form multiple scale sets from connected components of the multiple level image, in which different ones of the scale sets define different size spatial bins;
   for each of the multiple scale sets:
      generate a count of connected components extracted from the respective scale set for each spatial bin; and
      link adjacent spatial bins which represent connected components;
   merge the connected components from the different scale sets; and
   perform text line detection on the merged connected components.

2. The apparatus according to claim 1, in which for each of the multiple scale sets the count of components for each spatial bin comprises a histogram, and
   the at least one memory and the computer program code are configured with the at least one processor to cause the apparatus to at least further:
      for each of the multiple scale sets, after generating the histogram and prior to linking the adjacent spatial bins, filter out all spatial bins in which the count is less than a predetermined value.

3. The apparatus according to claim 2, in which each histogram defines a different size bin than any other histogram.

4. The apparatus according to claim 3, in which each histogram comprises at least two overlapping grids defining same size bins.

5. The apparatus according to claim 2, in which the at least one memory and the computer program code are configured with the at least one processor to cause the apparatus to at least further:
   for each of the multiple scale sets, after generating the histogram, extend the histogram by adding to each spatial bin the count from vertically and horizontally adjacent spatial bins; and thereafter filter out spatial bins comprising single regions;
   in which the linking of the adjacent spatial bins is performed on the extended histogram after the filtering.

6. The apparatus according to claim 5, in which all the spatial bins having a count less than the predetermined threshold are filtered out from the extended histogram.

7. The apparatus according to claim 6, in which the at least one memory and the computer program code are configured with the at least one processor to cause the apparatus to further perform at least one of the following:
   test text stroke width when linking adjacent bins or when performing text line detection to filter out false text character candidates; and
   compare size of characters and only link adjacent spatial bins if the underlying characters are of similar size.

8. The apparatus according to claim 1, in which the components are extracted from each multiple level using maximally stable extremal regions or binarization.

9. A method comprising:
converting a digital image to a multiple level image;
form multiple scale sets from connected components of the multiple level image by at least one processor, in which different ones of the scale sets define different size spatial bins;
for each of the multiple scale sets:
generating a count of connected components extracted from the respective scale set for each spatial bin; and
linking adjacent spatial bins which represent connected components;
merging the connected components from the different scale sets; and
performing text line detection on the merged connected components.

10. The method according to claim 9, in which for each of the multiple scale sets the count of connected components for each spatial bin comprises a histogram, the method further comprising:
for each of the multiple scale sets, after generating the histogram and prior to linking the adjacent spatial bins, filtering out all spatial bins in which the count is less than a predetermined value.

11. The method according to claim 10, in which each histogram defines a different size bin than any other histogram.

12. The method according to claim 11, in which each histogram comprises at least two overlapping grids defining same size bins.

13. The method according to claim 10, the method further comprising:
for each of the multiple scale sets, after generating the histogram, extending the histogram by adding to each spatial bin the count from vertically and horizontally adjacent spatial bins; and thereafter
filtering out spatial bins comprising single regions;
in which the linking of the adjacent spatial bins is performed on the extended histogram after the filtering.

14. The method according to claim 13, in which all the spatial bins having a count less than the predetermined threshold are filtered out from the extended histogram.

15. The method according to claim 14, the method further comprising at least one of the following:
testing text stroke width when linking adjacent bins or when performing text line detection to filter out false text character candidates; and
comparing size of characters and only linking adjacent spatial bins if the underlying characters are of similar size.

16. The method according to claim 9, in which the components are extracted from each multiple level using maximally stable extremal regions or binarization.

17. A non-transitory computer readable memory storing a program of instructions comprising:
code for converting a digital image to a multiple level image;
code for forming multiple scale sets from connected components of the multiple level image, in which different ones of the scale sets define different size spatial bins;
for each of the multiple scale sets:
code for generating a count of connected components extracted from the respective scale set for each spatial bin; and
code for linking adjacent spatial bins which represent connected components;
code for merging the connected components from the different scale sets; and
code for performing text line detection on the merged connected components.

18. The non-transitory computer readable memory according to claim 17, further comprising:
for each of the multiple scale sets, after the histogram is generated and prior to linking the adjacent spatial bins, code for filtering out all spatial bins in which the count is less than a predetermined value.

19. The non-transitory computer readable memory according to claim 18, further comprising:
for each of the multiple scale sets, after the histogram is generated, code for extending the histogram by adding to each spatial bin the count from vertically and horizontally adjacent spatial bins; and thereafter code for filtering out spatial bins comprising single regions;
in which the adjacent spatial bins which are linked are from the extended histogram after the filtering.

20. The non-transitory computer readable memory according to claim 19, in which all the spatial bins having a count less than the predetermined threshold are filtered out from the extended histogram.

* * * * *